US007312695B2

(12) United States Patent
Lehmer et al.

(10) Patent No.: US 7,312,695 B2
(45) Date of Patent: Dec. 25, 2007

(54) APPARATUS AND METHOD FOR DISPLAYING OPERATING CHARACTERISTICS ON STATUS INDICATORS

(75) Inventors: Matthew J. Lehmer, Arlington, VA (US); Nathan Boring, Allentown, PA (US); Aaron Dobbins, Macungie, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 50 days.

(21) Appl. No.: 11/191,780

(22) Filed: Jul. 28, 2005

(65) Prior Publication Data

US 2006/0272569 A1 Dec. 7, 2006

Related U.S. Application Data

(60) Provisional application No. 60/687,828, filed on Jun. 6, 2005, provisional application No. 60/687,691, filed on Jun. 6, 2005, provisional application No. 60/687, 689, filed on Jun. 6, 2005.

(51) Int. Cl.
*B60R 25/10* (2006.01)

(52) U.S. Cl. ................. 340/426.15; 315/294; 315/131; 315/132; 340/426.12; 307/140; 307/115; 307/139

(58) Field of Classification Search ................ 315/129, 315/131-133, 291, 294, 297, 153, 315, DIG. 4; 340/426.12, 426.15, 425.5, 438; 323/318; 116/200, 202, 204
See application file for complete search history.

(56) References Cited

U.S. PATENT DOCUMENTS

| | | | | |
|---|---|---|---|---|
| 3,959,791 | A | 5/1976 | Takahashi et al. | |
| 5,399,940 | A | 3/1995 | Hanna et al. | |
| 5,430,356 | A | 7/1995 | Ference et al. | |
| 5,909,087 | A * | 6/1999 | Bryde et al. | 315/149 |
| 6,690,268 | B2 * | 2/2004 | Schofield et al. | 340/438 |
| 6,968,707 | B2 * | 11/2005 | Violand et al. | 62/89 |

(Continued)

FOREIGN PATENT DOCUMENTS

FR 2 381 360 A1 9/1978

(Continued)

OTHER PUBLICATIONS

European Patent Office, International Search Report and Written Opinion, Feb. 14, 2007, 14 pages.

*Primary Examiner*—Haissa Philogene
(74) *Attorney, Agent, or Firm*—Mark E. Rose

(57) ABSTRACT

A user interface for a load control device allows a user to control an operating characteristic of a load to a plurality of discrete levels. The user interface comprises an adjustment member for allowing the user to select one of the discrete levels and a linear array of status indicators for displaying the discrete level. The number of discrete levels is greater than the number of status indicators. According to a first embodiment of the present invention, either one status indicator or two consecutive status indicators are illuminated to indicate the presently selected discrete level. According to a second embodiment, a fully illuminated status indicator is surrounded by two dimly illuminated status indicators to indicate the presently selected discrete level. According to a third embodiment, a single status indicator may be illuminated to indicate one or more of the discrete levels.

12 Claims, 7 Drawing Sheets

U.S. PATENT DOCUMENTS

| | | | | |
|---|---|---|---|---|
| 6,984,900 | B1 * | 1/2006 | Bruwer | 307/87 |
| 7,190,125 | B2 * | 3/2007 | McDonough et al. | 315/291 |
| 2006/0255959 | A1 * | 11/2006 | Salvestrini | 340/664 |
| 2006/0284734 | A1 * | 12/2006 | Newman, Jr. | 340/825 |
| 2007/0110192 | A1 * | 5/2007 | Steiner | 375/343 |

FOREIGN PATENT DOCUMENTS

| | | |
|---|---|---|
| GB | 2 085 164 A | 4/1982 |
| JP | 58 076770 A | 5/1983 |
| JP | 58 127171 A | 7/1983 |

* cited by examiner

APPARATUS AND METHOD FOR DISPLAYING OPERATING CHARACTERISTICS ON STATUS INDICATORS

RELATED APPLICATIONS

This application is related to Provisional Application No. 60/687,828, filed Jun. 6, 2005, entitled METHOD AND APPARATUS FOR QUIET VARIABLE MOTOR SPEED CONTROL, which is assigned to the assignee of the present application, the entire disclosure of which is hereby incorporated by reference. The above application will herein be referred to as the “Motor Speed Control” application.

This application is related to Provisional Application No. 60/687,691, filed Jun. 6, 2005, entitled POWER SUPPLY FOR A LOAD CONTROL DEVICE, which is assigned to the assignee of the present application, the entire disclosure of which is hereby incorporated by reference. The above application will herein be referred to as the “Power Supply” application.

This application is related to Provisional Application No. 60/687,689, filed Jun. 6, 2005, entitled SYSTEM FOR CONTROL OF LIGHTS AND MOTORS, which is assigned to the assignee of the present application, the entire disclosure of which is hereby incorporated by reference. The above application will herein be referred to as the “System” application.

FIELD OF THE INVENTION

The present invention relates to load control devices for controlling a connected load, and more particularly, for controlling the speed of a fan motor. Specifically, the present invention relates to a method and an apparatus for displaying a discrete number of motor speeds, M, using a discrete number of status indicators, N, such as light emitting diodes, where M is greater than N.

BACKGROUND OF THE INVENTION

A conventional wall-mounted load control device is mounted to a standard electrical wall box and is connected in series electrical connection with a load. Standard load control devices, such as dimmers and fan speed controls, use one or more semiconductor switches, such as triacs or field effect transistors (FETs), to control the current delivered to the load, and thus, the intensity of the lighting load or the speed of the motor.

Wall-mounted load control devices typically include a user interface having a means for adjusting the intensity or the speed of the load, such as a linear slider, a rotary knob, or a rocker switch. Some load control devices also include a button that allows for toggling of the load from off (i.e., no power is conducted to the load) to on (i.e., power is conducted to the load). It is often desirable to include a plurality of status indicators, such as light emitting diodes (LEDs), on the user interface to indicate the intensity or speed of the load.

FIG. 1 shows the user interface of a prior art dimmer 10 having a plurality of status indicators 20. As shown, the dimmer 10 includes a faceplate 30, a bezel 35, an intensity selection actuator 40 for selecting a desired level of light intensity of an associated lighting load controlled by the dimmer, and a control switch actuator 50. Pressing the actuator 50 may cause the associated lighting load to toggle from on to off, or vice versa. Actuation of the upper portion of actuator 40 increases or raises the light intensity of the lighting load, while actuation of the lower portion of actuator 40 decreases or lowers the light intensity. The intensity levels of the lighting load may range from a minimum intensity level, which is preferably the lowest visible intensity, but which may be zero, or “full off,” to a maximum intensity level, which is typically “full on.” Light intensity level is typically expressed as a percent of full intensity. Thus, when the lighting load is on, light intensity level may range from 1% to 100%.

The dimmer 10 also includes an intensity level indicator in the form of the plurality of status indicators 20. The status indicators 20 may be arranged in an array (such as a linear array as shown) representative of a range of light intensity levels of the lighting load being controlled. The status indicators 20 operate to indicate the intensity of the associated lighting load by illuminating a percentage of the individual status indicators equivalent to the dimming level (i.e., the percentage of full intensity). For example, if the dimmer 10 is controlling the lighting load to 50%, the middle status indicator will be illuminated, since this status indicator is at the midpoint of the linear array of the status indicators 20.

Since it is common to include a lighting load in the same enclosure as a fan motor, load control devices that include both a dimmer circuit and a fan speed control circuit in a single wall-mountable device to provide independent control of the lighting load and the fan motor have been developed. Prior art dual light/fan control devices have not included rocker switches or status indicators (as the dimmer 10 of FIG. 1), but have included two side-by-side sliders, the positions of which have inherently provided visual feedback of the lighting level and the fan speed level. One example of a dual light/fan speed control is the SKYLARK Dual Slide-to-off Fan Speed Control and Dimmer, model number S2-LFSQ, manufactured by Lutron Electronics Co., Inc.

It is desirable to provide illuminated status indicators on the user interface of a dual light/fan speed control that are independent of any actuators in order to provide feedback of both the controlled light level and the fan speed to the end user. While the feedback provided by the status indicators 20 of the prior art dimmer 10 approximates the light level of the controlled load, a second means of visual feedback is provided to the user of the dimmer through observation of changes in the intensity of the physical lighting load. However, when a fan motor is controlled by a load control device, the mechanical inertia of the fan motor is so great that an immediate visual feedback of the speed of the fan motor by observation of the fan is not possible. Thus, there is a need to provide immediate visual feedback of the speed of the fan motor on the status indicators, so that the user will know to what speed the fan motor is being controlled.

Most prior art quiet fan speed controls have only allowed a user to control the fan speed to one of a select number of discrete speeds, which is often only three speeds. However, it is desirable to offer a greater number of discrete fan speeds that are selectable from the user interface of a fan speed control. If the number of discrete fan speeds is greater than the number of status indicators provided on the user interface, it is not possible to display the fan speeds, as a percentage of the maximum fan speed (as the dimmer 10 displays the intensity of the lighting load), using only a single active or illuminated stats indicator for each discrete speed.

Thus, there exists a need for a fan speed control that offers a discrete number of fan speeds M that is greater than the number of status indicators N on the user interface. There is also a need for a method for illuminating the status indicators to provide a unique indication of each discrete fan speed so that an end user can easily and immediately determine the present status of the fan speed control.

SUMMARY OF THE INVENTION

According to the present invention, a user interface for a load control device allows a user to control an operating characteristic of a load to M discrete levels. The user interface includes an adjustment member for allowing the user to change between the M discrete levels and N status indicators for indicating a presently selected one of the M discrete levels. The N status indicators are arranged in a linear array. Further, the number of discrete levels (M) is greater than the number of status indicators (N). According to a first embodiment of the present invention, either one status indicator is illuminated, or two consecutive status indicators are illuminated, to indicate the presently selected one of the M discrete levels. According to a second embodiment of the present invention, three consecutive status indicators are illuminated to indicate the presently selected one of the M discrete levels, wherein the three consecutive status indicators may comprise a fully illuminated status indicator surrounded by two dimly illuminated status indicators. According to a third embodiment of the present invention, a single status indicator may be illuminated to indicate one or more of the M discrete levels.

Other features and advantages of the present invention will become apparent from the following description of the invention that refers to the accompanying drawings.

DETAILED DESCRIPTION OF THE INVENTION

Figure 1:
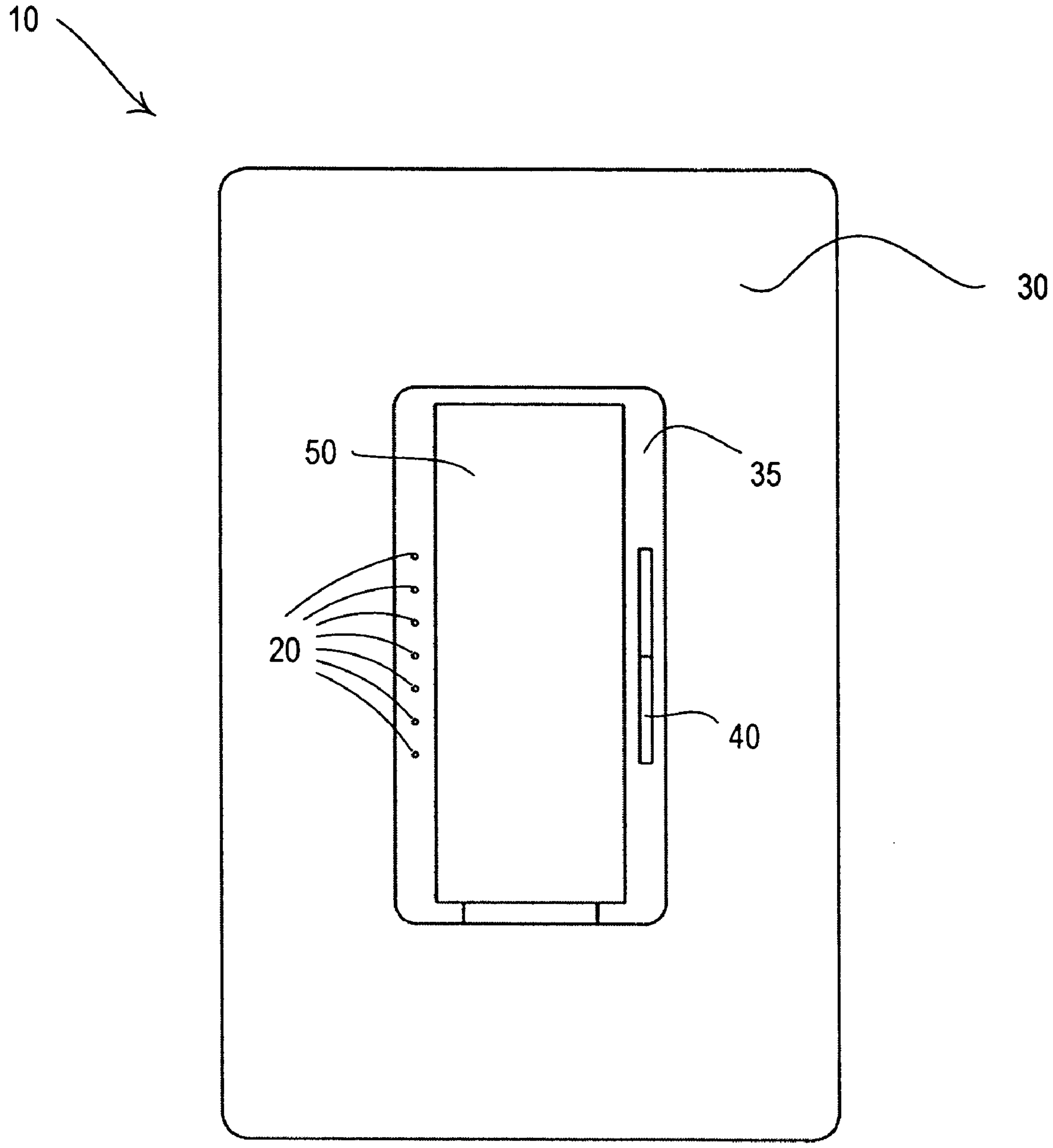
FIG. 1 PRIOR ART
FIG. 1 shows the user interface of a prior art dimmer having a plurality of status indicators.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

Figure 2:
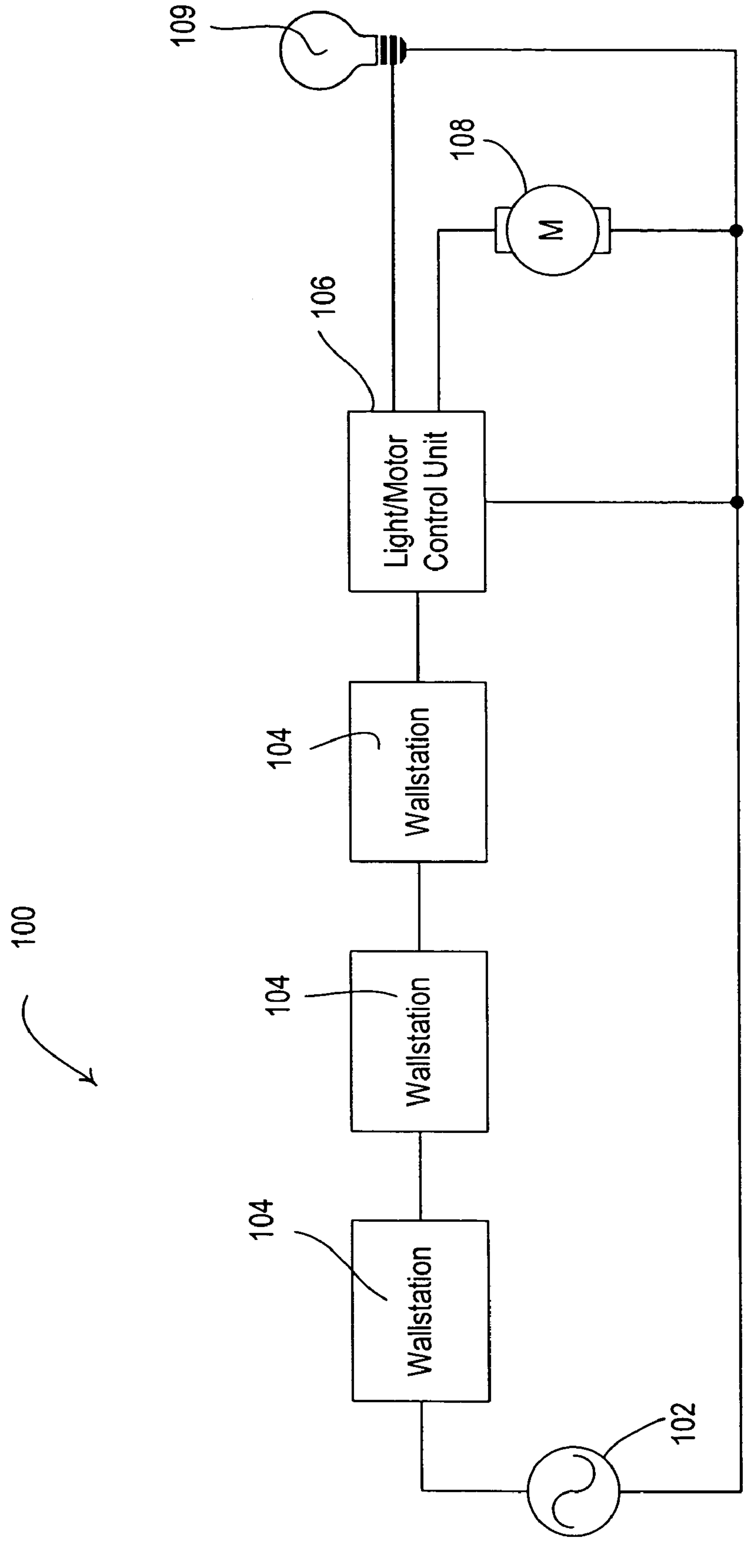
FIG. 2 is a simplified block diagram of a system for control of lights and motors according to the present invention.

A block diagram of a system 100 for independent control of lights and motors is shown in FIG. 2. The system includes a plurality of wallstations 104 that are connected in series between an AC voltage source 102 and a light/motor control unit 106. The light/motor control unit 106 is operable to control both the speed of a motor load 108 and the intensity of a lighting load 109. The light/motor control unit 106 may provide continuously variable speed control of the fan motor 108, or may provide discrete variable speed control of the fan motor. A circuit for continuously variable fan speed control is described in the co-pending "Motor Speed Control" application.

Figure 3:
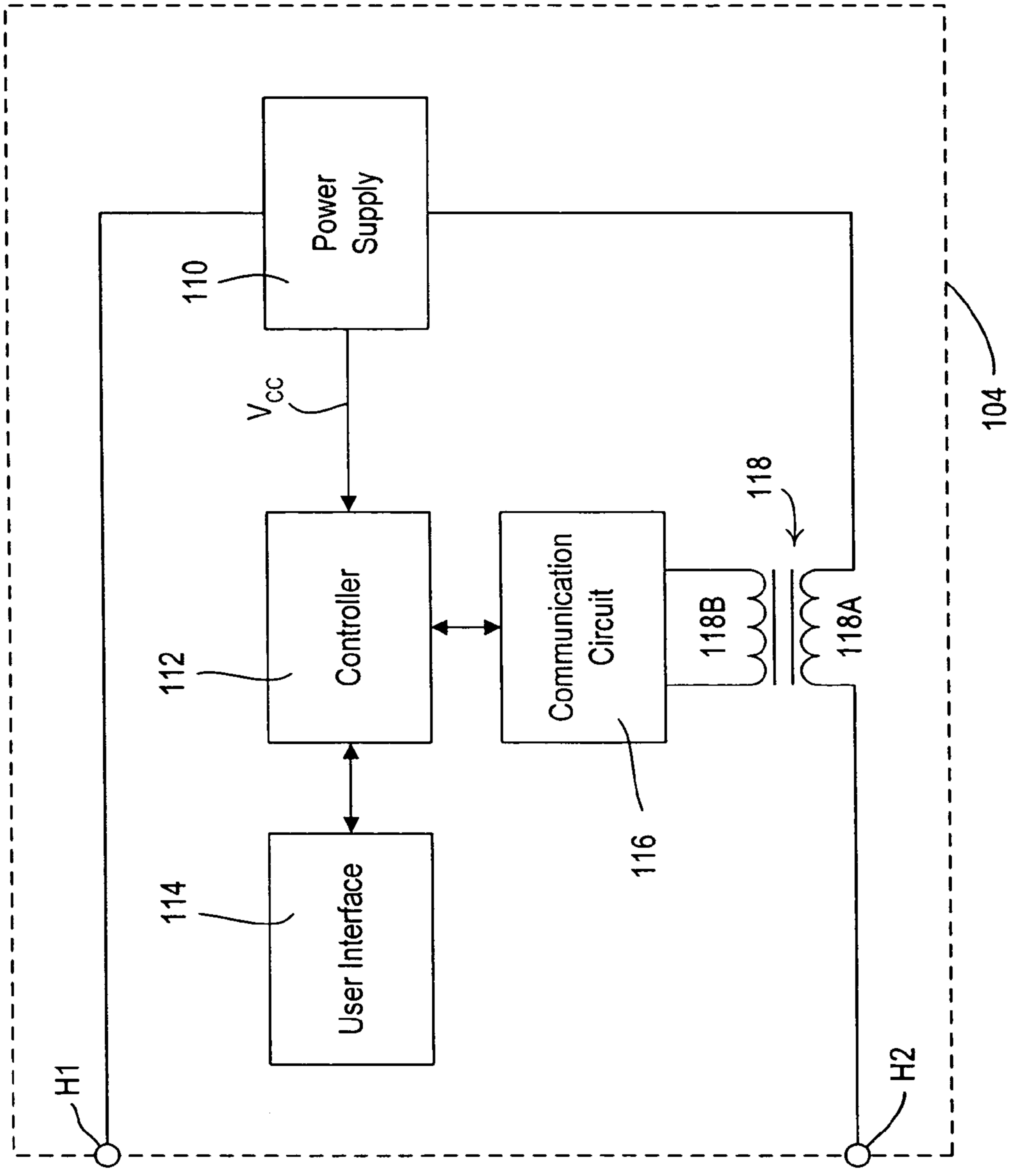
FIG. 3 is a simplified block diagram of a wallstation of the system of FIG. 2.

A simplified block diagram of the wallstation 104 is shown in FIG. 3. A power supply 110 is provided in series between a first electrical terminal H1 and a second electrical terminal H2. The power supply 110 provides a DC voltage, $V_{CC}$, to power a controller 112. The power supply 110 of the wallstation 104 is described in greater detail in the co-pending "Power Supply" application. The controller 112 is preferably implemented as a microcontroller, but may be any suitable processing device, such as a programmable logic device (PLD), a microprocessor, or an application specific integrated circuit (ASIC). A user interface 114 includes a plurality of buttons for receiving inputs from a user and a plurality of status indicators, e.g., light emitting diodes (LEDs), for providing feedback to the user. The controller 112 accepts control inputs from the buttons of the user interface 114 and controls the operation of the LEDs.

The controller 112 is also coupled to a communication circuit 116 for transmitting and receiving control information to and from the light/motor control unit 106 and the other wallstations 104 of system 100. The communication circuit 116 transmits and receives the control information via a communications transformer 118 over the hot line, which is coupled from the AC voltage source 102 via the wallstations 104 to the light/motor control unit 106. The communications transformer 118 has a primary winding 118A that is connected in series electrical connection with the terminals H1, H2 of the wallstation 104, and a secondary winding 118B that is coupled to the communication circuit 116. The communication scheme of the system 100 for independent control of lights and motors is described in greater detail in the co-pending "System" application.

Figure 4:
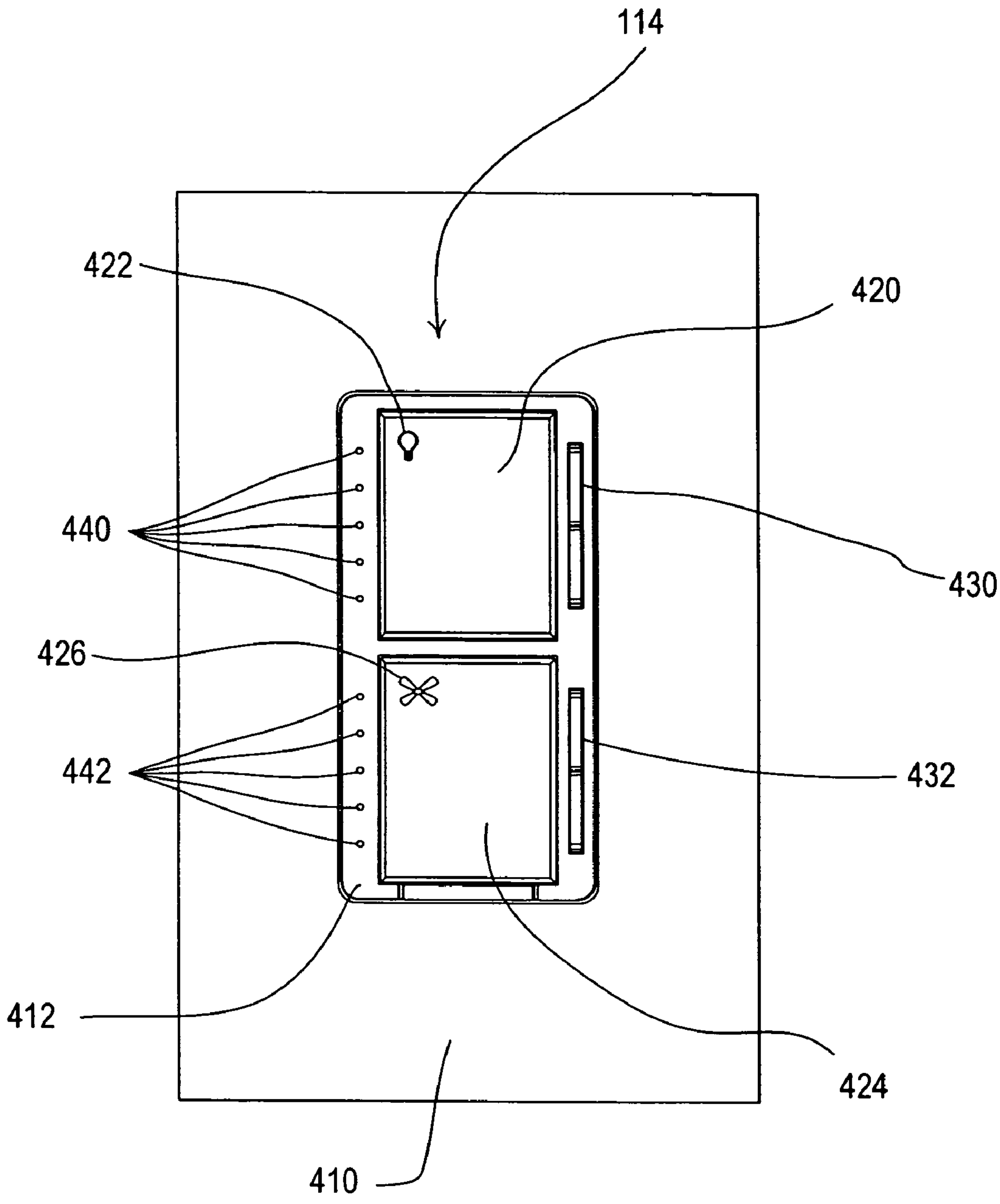
FIG. 4 shows a user interface of the wallstation of the system of FIG. 2.

FIG. 4 shows the user interface 114 of the wallstation 104 of the system 100 of FIG. 2. The wallstation 104 includes a faceplate 410 and a bezel 412, on which the components of the user interface 114 are provided. The user interface 114 includes a first toggle actuator 420, which is marked with a light bulb icon 422, and allows the user to toggle the lighting load 109 on and off. A second toggle actuator 424 is marked with a fan icon 426 and allows the user to toggle the fan motor 108 on and off. Adjacent to the first toggle actuator 420 and the second toggle actuator 424 is a first adjustment actuator 430 and a second adjustment actuator 432, respectively. Pressing the upper portion of the first adjustment actuator 430 causes the intensity of the lighting load 109 to increase and pressing the lower portion causes the intensity to decrease. Similarly, pressing the upper and lower portions of the second adjustment actuator 432 causes the speed of the fan motor 108 to increase and decrease, respectively.

The user interface 114 also includes a first group of status indicators 440 adjacent the first actuator 420 and a second group of status indicators 442 adjacent the second actuator 424. As shown in FIG. 4, each group of status indicators comprises five light emitting diodes (LEDs) in a linear array. The first group of status indicators 440 collectively display the intensity of the lighting load and the second group of status indicators 442 collectively display the speed of the fan motor. The first group of status indicators 440 display the intensity of the lighting load 109 in the same manner as the status indicators 20 of the prior art dimmer 10 of FIG. 1.

If the light/motor control unit 106 provides continuously variable control of the fan motor 108, the status indicators 442 may operate to illuminate a percentage of the status indicators that corresponds to the present speed of the motor as a percentage of the maximum speed (i.e., in a manner similar to the operation of the status indicators 20 of the prior art dimmer 10 of FIG. 1). If the light/motor control unit 106 allows for the selection of a number of discrete speeds of the fan motor 108 that is equal to the number of status indicators 442 (e.g., five in FIG. 4), then preferably only one status indicator is lit to designate each discrete speed of the fan motor. When the fan motor is off, all status indicators will be off. However, when the number of discrete fan speeds exceeds the number of status indicators 442, then each discrete fan speed can no longer be uniquely represented by a single status indicator.

Figure 5:
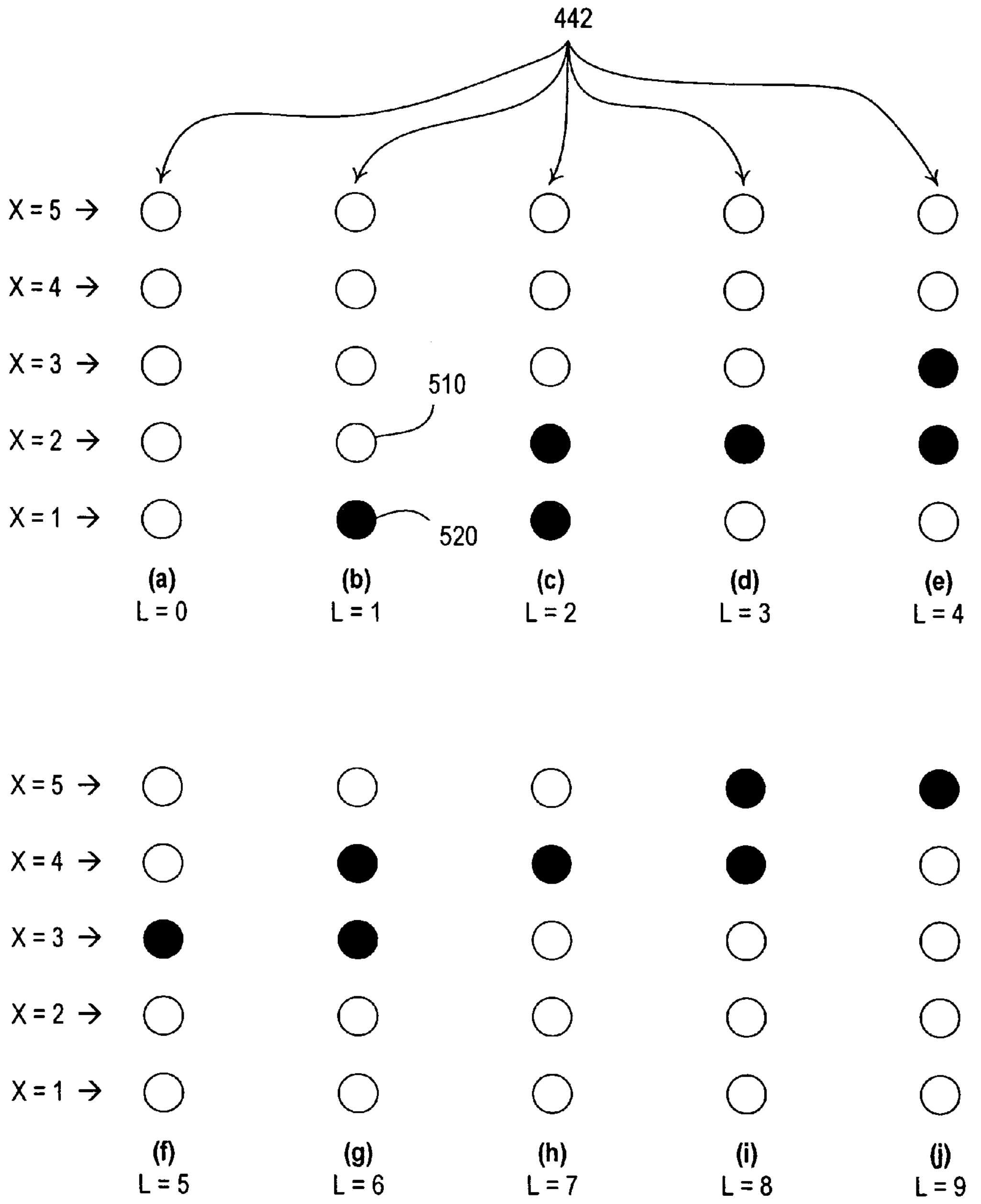
FIG. 5 shows status indicators of the user interface of FIG. 4 that demonstrate a first embodiment of an illumination scheme for indicating M fan speeds on N status indicators, where M is greater than N, according to the present invention.

FIG. 5 demonstrates a first embodiment for illuminating the status indicators 442 to indicate M fan speeds on N status indicators, where M is greater than N. In the case of FIG. 5, the number N of status indicators 442 is five, while the number M of discrete fan speeds is nine. The status indicators 442 are arranged in a linear array with each individual status indicator, X, having a value of $1 \leqq X \leqq N$. A non-illuminated status indicator 510 is designated by a white circle and a fully illuminated status indicator 520 is designated by a black circle. Each of the different fan speeds, L, where $1 \leqq L \leqq M$ is represented by a unique combination of illuminated status indicators. The off speed (L=0), i.e., when the fan motor is not moving, is not considered one of the M fan speeds since none of the status indicators are illuminated for this speed as shown in FIG. 5(*a*).

The configurations of status indicators shown in FIG. 5 are preferably ordered such that as greater discrete fan speeds are selected, status indicators higher in the linear array are illuminated (i.e., X increases as L increases). For example, when the fan motor is operating at the lowest non-zero fan speed, only the bottom status indicator in the linear array is illuminated as shown in FIG. 5(*b*). When the fan motor is operating at a higher speed, for example, the third speed from the off speed (L=3), the second status indicator (X=2) from the bottom of the linear array is illuminated as shown in FIG. 5(*d*). The highest status indicator (X=5) in the linear array is illuminated for the highest discrete fan speed (L=9) as shown in FIG. 5(*c*). Thus, when L is odd, the illuminated status indicator $X_1$ can be found by $$X_1=(L+1)/2. \quad \text{(Equation 1)}$$

In order to display a number of fan speeds greater than the number of status indicators, two status indicators are illuminated for some of the fan motor speeds (i.e., when L is even), as shown in FIGS. 5(*c*), 5(*e*), 5(*g*), and 5(*i*). The two illuminated status indicators are those that are also illuminated for the next higher speed (i.e., L+1) and next lower speed (i.e., L−1). For example, to designate the second speed from the off speed, i.e., L=2, the two bottom status indicators are illuminated as shown in FIG. 5(*c*). Thus, when L is even, the two illuminated status indicators $X_1$, $X_2$ can be found by $$X_1=L/2;\ X_2=L/2+1. \quad \text{(Equation 2)}$$

The status indicators that are illuminated for even and odd values of L are summarized in the table below.

TABLE 1

| Motor Speed (L) | Illuminated Status Indicators ($X_1$, $X_2$) | Notes |
|---|---|---|
| L is odd | $X_1 = (L + 1)/2$ | Only one status indicator is illuminated. |
| L is even | $X_1 = L/2$; $X_2 = L/2 + 1$ | Two status indicators are illuminated. |

For the embodiment of FIG. 5, nine different configurations of illuminated status indicators are possible, and thus, nine different fan speeds can be identified using only the five status indicators 442 of the user interface 114. As increasingly greater discrete fan speeds are chosen, successively higher status indicators are illuminated as shown in FIGS. 5(*b*) to 5(*j*). However, the embodiment as described with reference to FIG. 5 need not be limited to five status indicators and nine fan speeds. The number of fan speeds that can be displayed for a different number of status indicators, using the method of this embodiment, can be determined by $$M=2*N-1, \quad \text{(Equation 3)}$$

where M is the number of fan speeds and N is the number of status indicators.

Figure 6:
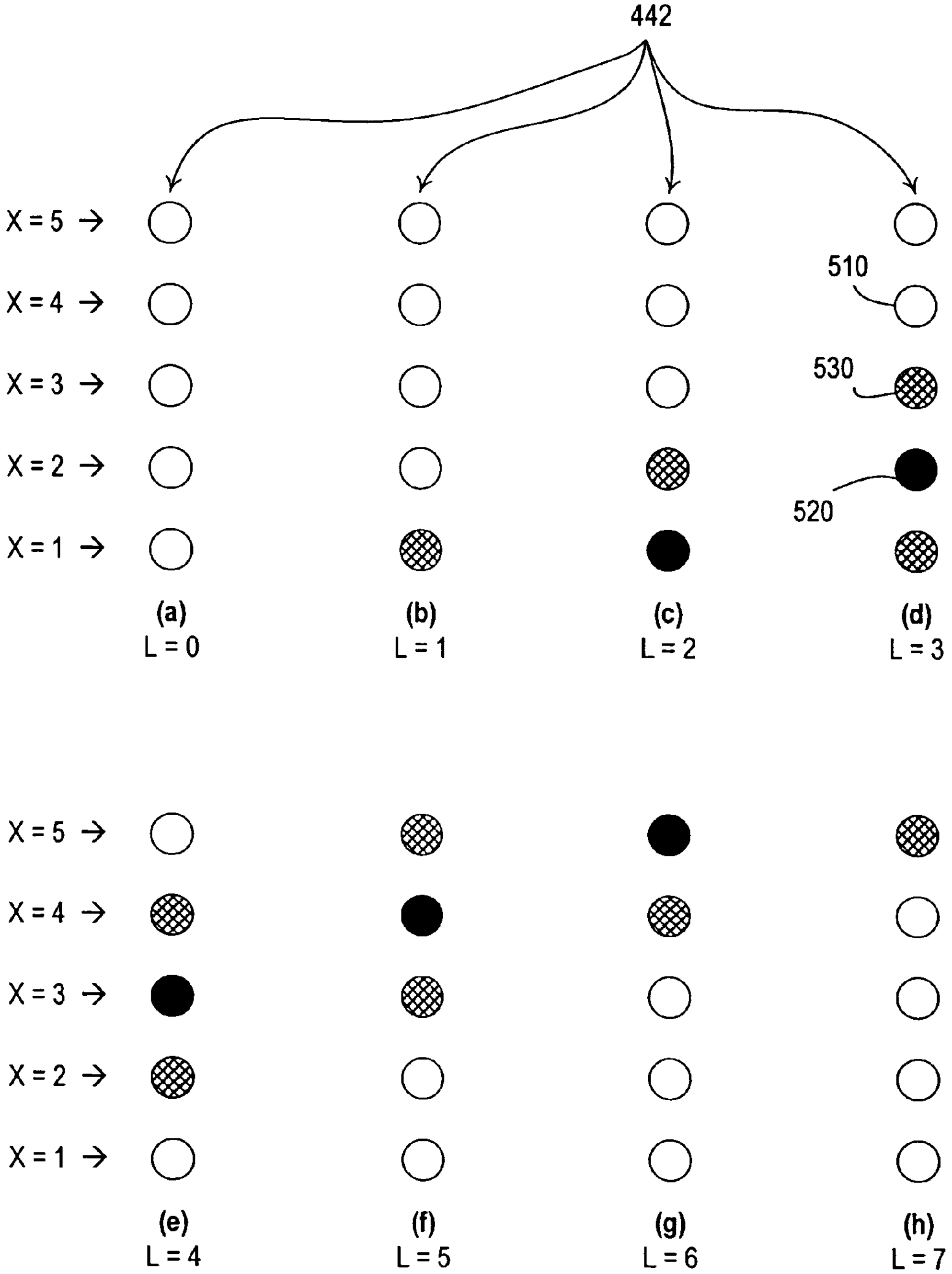
FIG. 6 shows status indicators of the user interface of FIG. 4 that demonstrate a second embodiment of an illumination scheme for indicating M fan speeds on N status indicators, where M is greater than N, according to the present invention.

FIG. 6 demonstrates a second embodiment for illuminating the status indicators 442 to indicate M fan speeds on N status indicators, where M is greater than N. In FIG. 6, the number N of status indicators 442 is five, while the number M of discrete fan speeds is seven. A dimly illuminated status indicator 530 is designated by a crosshatched circle. The dimly illuminated status indicator 530 is illuminated at an intensity level that is less than the intensity level of the fully illuminated status indicator 520, but substantially different in intensity, such that the user of the load control device is able to distinguish the difference in the intensities of the dimly illuminated status indicator and the fully illuminated status indicator. Once again, the off speed (L=0), i.e., when the fan motor is not moving, is not considered one of the M fan speeds since no status indicators are illuminated for this speed as shown in FIG. 6(*a*).

The method of FIG. 6 attempts to illuminate three consecutive status indicators $X_1$, $X_2$, $X_3$ for each discrete speed. Preferably, the middle of the three status indicators $X_2$ is fully illuminated, while the two surrounding status indicators $X_1$, $X_3$ are dimly illuminated as shown in FIG. 6(*d*). The group of three consecutive illuminated status indicators "moves" up and down the linear array as the fan speed is increased and decreased, respectively. For the $L^{th}$ motor speed when $3 \leqq L < M-1$, the three illuminated status indicators can be found by $$X_1=L-2;\ X_2=L-1;\ X_3=L. \quad \text{(Equation 4)}$$

Regarding the configurations of status indicators near the high-end and low-end of the fan speed range, fewer than three status indicators are illuminated. For the lowest non-zero speed, as shown in FIG. 6(*b*), and the highest speed, as shown in FIG. 6(*h*), only one status indicator is illuminated dimly. Furthermore, as shown in FIGS. 6(*c*) and 6(*g*), only two status indicators are illuminated—one fully and one dimly.

Thus, when $3 \leqq L < M-1$, three status indicators are illuminated as determined by Equation 4 above. When L=2 or L=M−1, two status indicators are illuminated, and when L=1 or L=M, only one status indicator is illuminated. The status indicators that are illuminated for each value of L for the embodiment of FIG. 6 is summarized in the following table.

TABLE 2

| Motor Speed (L) | Illuminated Status Indicators ($X_1$, $X_2$, $X_3$) | Notes |
|---|---|---|
| 1 | $X_1 = 1$ | Only the lowest status indicator is illuminated. |
| 2 | $X_1 = 1$; $X_2 = 2$ | Only the two lowest status indicators are illuminated. |
| $3 \leqq L < M - 1$ | $X_1 = L - 2$; $X_2 = L - 1$; $X_3 = L$ | Only three consecutive status indicators are illuminated. |
| M − 1 | $X_1 = N - 1$; $X_2 = N$ | Only the two highest status indicators are illuminated. |
| M | $X_1 = N$ | Only the highest status indicator is illuminated. |

Summarizing further, for all motor speeds L, $$X_1=L-2;\ X_2=L-1;\ X_3=L \text{ for } 1\leqq L\leqq M, \qquad \text{(Equation 5)}$$

and $X_1$, $X_2$, $X_3$ are lit if and only if $1\leqq X\leqq N$.

For the embodiment of FIG. 6, seven different configurations of status indicators to indicate seven different fan speeds are possible with the five status indicators 442 of the user interface 114. As increasingly greater discrete fan speeds are chosen, successively higher status indicators are illuminated as shown in FIGS. 6(*b*) to 6(*h*). The embodiment as described with reference to FIG. 6 need not be limited to using five status indicators and seven fan speeds. The number of fan speeds that can be displayed for a different number of status indicators, using the method of this embodiment, can be determined by $$M=(N+2), \qquad \text{(Equation 6)}$$

where M is the number of discrete fan speeds and N is the number of status indicators. Further, the number of fan speeds that can be displayed on the status indicators is not limited to utilizing one fully illuminated status indicator surrounded by two dimly illuminated status indicators. For example, all three of the consecutively illuminated status indicators could be fully illuminated.

Figure 7:
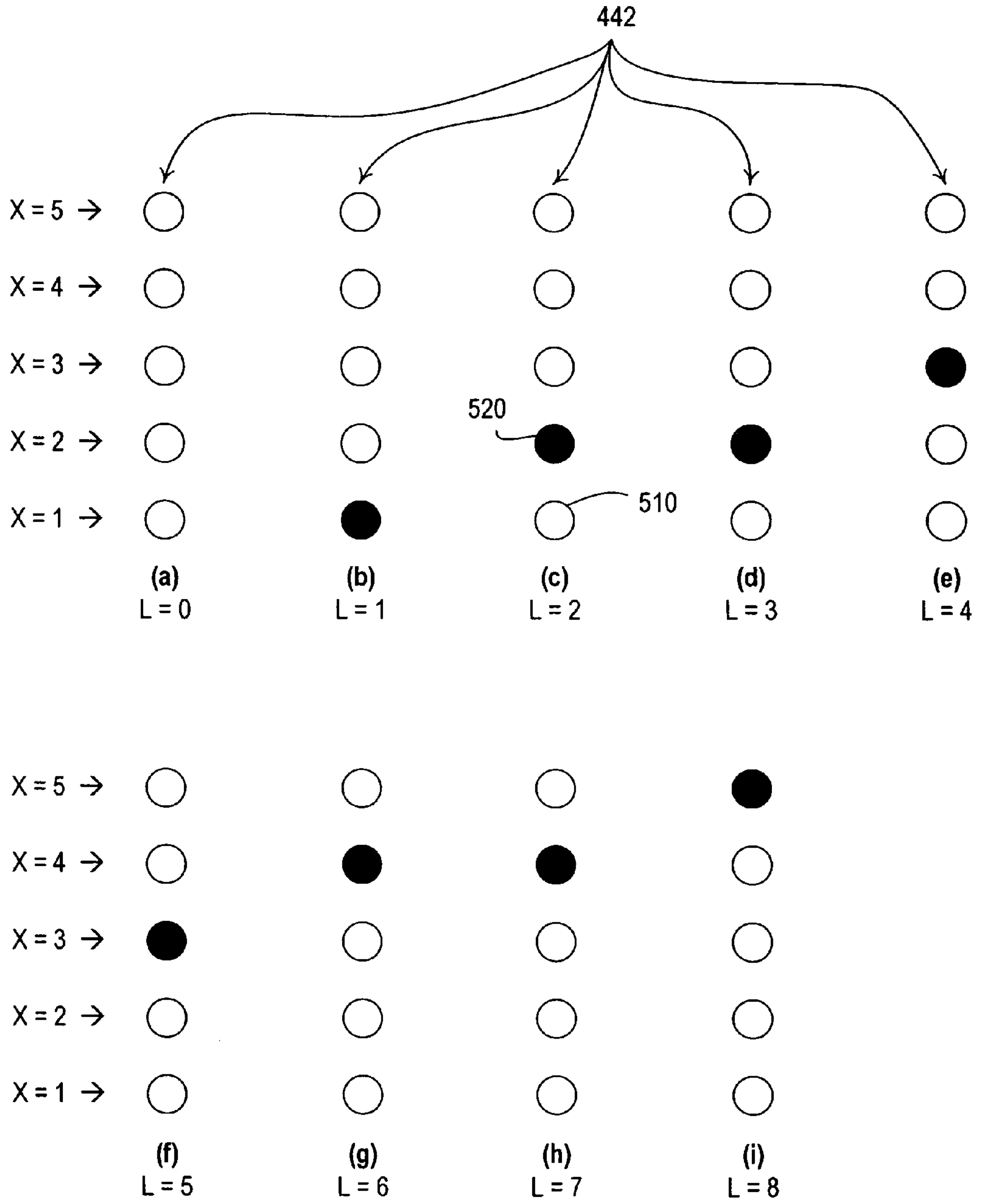
FIG. 7 shows status indicators of the user interface of FIG. 4 that demonstrate a third embodiment of an illumination scheme for indicating M fan speeds on N status indicators, where M is greater than N, according to the present invention.

FIG. 7 shows a third embodiment for illuminating the status indicators 442 to indicate M fan speeds on N status indicators, where M is greater than N. In FIG. 7, the number N of status indicators 442 is five, while the number M of discrete fan speeds is eight. Once again, the off speed (L=0), i.e., when the fan motor is not moving, is not considered part of the M fan speeds since no status indicators are illuminated for this speed as shown in FIG. 7(*a*).

With the embodiment of FIG. 7, multiple fan speeds (for example, two speeds in FIG. 7) are indicated by the same configurations of status indicators. For example, the second fan speed (L=2) and third fan speed (L=3) above the zero fan speed are represented by the same status indicator configuration as shown in FIGS. 7(*c*) and 7(*d*), i.e., the second status indicator (X=2) from the bottom of the linear array is illuminated. For the configurations of status indicators at the high-end (L=8) or low-end (L=1) of the fan speed range, only the top status indicator (X=5) or bottom status indicator (X=1), respectively, is illuminated as shown in FIGS. 7(*b*) and 7(*i*).

Thus, in the embodiment of FIG. 7, the illuminated status indicator X for each fan speed L can be found by $$X=\text{FLOOR}[(L+2)/2], \qquad \text{(Equation 7)}$$

where the function FLOOR(A) is equal to the largest integer less than A.

Therefore, for the embodiment of FIG. 7, eight configurations of status indicators (even though some configurations of status indicators are identical) and seven different fan speeds are possible with the five status indicators 442 of the user interface 114. As increasingly greater fan speeds are chosen, successively higher status indicators are illuminated as shown in FIGS. 7(*b*) to 7(*i*). The embodiment as described with reference to FIG. 7 is not limited to five status indicators and eight fan speeds. The number of fan speeds that can be displayed for a different number of status indicators, using the method of this embodiment, can be determined by $$M=2*N-2, \qquad \text{(Equation 8)}$$

where M is the number of fan speeds and N is the number of status indicators.

The number of fan speeds that can be displayed can be increased further if more than two fan speeds are indicated by the same configuration of status indicators. If a number K of multiple fan speeds are indicated by the same configuration of status indicators, the status indicator X that will be illuminated for a fan speed L is $$X=\text{FLOOR}[\{L+2*(K-1)\}/K], \qquad \text{(Equation 9)}$$

where $1\leqq L\leqq M$. Further, the total number of fan speeds M that can be displayed is increased to $$M=K*(N-2)+2. \qquad \text{(Equation 10)}$$

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A user interface for a load control device for allowing a user to control an operating characteristic of a load to a plurality M of discrete levels, comprising:

an adjustment member for allowing the user to select one of the M discrete levels; and a plurality N of illuminable status indicators arranged in a linear array for indicating a presently selected discrete level L of the M discrete levels, the number M greater than the number N and equal to (2*N—1), each of the M discrete levels indicated by a unique combination of illuminated status indicators selected from the group consisting of one illuminated status indicator and two consecutive illuminated status indicators;

wherein one status indicator $X_1$ is illuminated to indicate the discrete level L if L is odd, where $X_1$ equals ((L+1)/2), and two consecutive status indicators $X_2$ and $X_3$ are simultaneously illuminated to indicate the discrete level L if L is even, where $X_2$ equals (L/2) and $X_3$ equals (L/2+1).

2. A method for indicating a presently selected discrete level L of a plurality M of discrete levels on a plurality N of illuminable status indicators arranged in a linear array, the number M greater than the number N and equal to (2*N−1), the method comprising the steps of:

illuminating one status indicator $X_1$ if the presently selected discrete level L is odd, where $X_1$ equals ((L+1)/2); and simultaneously illuminating two consecutive status indicators $X_2$ and $X_3$ if the presently selected discrete level L is even, where $X_2$ equals (L/2+1).

3. A method for indicating a presently selected discrete level L of a plurality M of discrete levels on a plurality N of illuminable status indicators arranged in a linear array, the number M greater than the number N, the method comprising the step of:

illuminating one status indicator X to indicate a plurality K of discrete levels, such that X equals FLOOR[{L+2*(K−1)}/K] and $2 \leqq K \leqq 3$;

wherein M equals (K*(N−2)+2).

4. A user interface for a load control device for allowing a user to control an operating characteristic of a load to a plurality M of discrete levels, comprising:

an adjustment member for allowing the user to select one of the M discrete levels; and a plurality N of illuminable status indicators for indicating a presently selected discrete level L of the M discrete levels, the N status indicators arranged in a linear array;

wherein the number M is greater than the number N; and wherein first, second, and third consecutive status indicators $X_1$, $X_2$, $X_3$ are illuminated to indicate the discrete level L.

5. The user interface of claim 4, wherein the first consecutive status indicator $X_1$ and the third consecutive status indicator $X_3$ are illuminated to a dim level.

6. The user interface of claim 4, wherein M equals (N+2).

7. The user interface of claim 4, wherein to indicate the discrete level L for $1 \leqq l \leqq M$, $X_1$ equals (L−2) and is illuminated if and only if $1 \leqq X_1 \leqq N$;

$X_2$ equals (L−1) and is illuminated if and only if $1 \leqq X_2 \leqq N$; and $X_3$ equals L and is illuminated if and only if $1 \leqq X_3 \leqq N$.

8. A user interface for a load control device for allowing a user to control an operating characteristic of a load to a plurality M of discrete levels, comprising:

an adjustment member for allowing the user to select one of the M discrete levels; and a plurality N of illuminable status indicators for indicating a presently selected discrete level L of the M discrete levels, the N status indicators arranged in a linear array;

wherein the number M is greater than the number N;

one status indicator X is illuminated to indicate a plurality K of discrete levels with$2 \leqq K \leqq 3$;

M equals (K*(N−2)+2); and to indicate the discrete level L, X equals FLOOR[{L+2*(K−1)}/K].

9. A method for indicating a presently selected discrete level L of a plurality M of discrete levels on a plurality N of illuminable status indicators arranged in a linear array, the number M greater than the number N, the method comprising the step of:

illuminating first, second, and third consecutive status indicators $X_1$, $X_2$, $X_3$ to indicate the discrete level L.

10. The method of claim 9, wherein the step of illuminating comprises:

illuminating the second consecutive status indicator $X_2$ to a full level; and illuminating the first consecutive status indicator $X_1$ and the third consecutive status indicator $X_3$ to a dim level, the dim level having an intensity substantially less than the full level.

11. The method of claim 9, wherein M equals (N+2).

12. The method of claim 9, wherein the step of illuminating comprises:

illuminating the first consecutive status indicator $X_1$, such that $X_1$ equals (L−2), if and only if $1 \leqq X_1 \leqq N$;

illuminating the second consecutive status indicator $X_2$, such that $X_2$ equals (L−1), if and only if $1 \leqq X_2 \leqq N$; and illuminating the third consecutive status indicator $X_3$, such that $X_3$ equals L, if and only if $1 \leqq X_3 \leqq N$;

wherein $1 \leqq L \leqq M$.

* * * * *